US008615499B2

(12) United States Patent
Chambliss et al.

(10) Patent No.: US 8,615,499 B2
(45) Date of Patent: Dec. 24, 2013

(54) ESTIMATING DATA REDUCTION IN STORAGE SYSTEMS

(75) Inventors: David D. Chambliss, Morgan Hill, CA (US); Mihail C. Constantinescu, San Jose, CA (US); Joseph S. Glider, Palo Alto, CA (US); Maohua Lu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/360,628

(22) Filed: Jan. 27, 2012

(65) Prior Publication Data

US 2013/0198148 A1   Aug. 1, 2013

(51) Int. Cl.
    G06F 17/30   (2006.01)
(52) U.S. Cl.
    USPC .......................................................... 707/693
(58) Field of Classification Search
    USPC .......................................................... 707/693
    See application file for complete search history.

(56) References Cited

U.S. PATENT DOCUMENTS

| 2005/0038766 | A1* | 2/2005 | Bantz et al. ........................ 707/1 |
| 2005/0100224 | A1* | 5/2005 | Henry et al. ................... 382/232 |
| 2005/0132161 | A1* | 6/2005 | Makela et al. ................. 711/170 |
| 2007/0140559 | A1* | 6/2007 | Rambharack et al. ........ 382/171 |
| 2007/0255758 | A1* | 11/2007 | Zheng et al. .................. 707/200 |
| 2008/0256143 | A1 | 10/2008 | Reddy et al. |
| 2010/0250501 | A1* | 9/2010 | Mandagere et al. .......... 707/692 |
| 2010/0250896 | A1* | 9/2010 | Matze ........................... 711/216 |
| 2010/0281207 | A1 | 11/2010 | Miller et al. |
| 2010/0306412 | A1 | 12/2010 | Therrien et al. |
| 2011/0125722 | A1 | 5/2011 | Rao et al. |
| 2011/0231172 | A1* | 9/2011 | Gold .............................. 703/13 |

OTHER PUBLICATIONS

Alvarez et al., Space Savings Estimation Tools, Nov. 2010.*
EMC, Reducing Backup Storage Requirements in SAP Non-production Environments with EMC Disk Library Data Deduplication, Aug. 2009.*
Schulz, G., "Application Agnostic Real-time Data Compression", StorageIO, Feb. 11, 2008, pp. 1-7, StorageIO, United States.
Katiyar, A. et al., "ViDeDup: An Application-Aware Framework for Video De-duplication", Proceedings of the 3rd USENIX conference on Hot Topics in Storage and File Systems, Jun. 2011, pp. 1-5, USENIX Association, United States.
Wall, B., "Shrinking your storage—and costs!", ISPEC, Feb. 2010, pp. 28-3, vol. 10, No. 1, Business and Technical Communications Ltd., United Kingdom.

(Continued)

Primary Examiner — William Spieler
(74) Attorney, Agent, or Firm — Kenneth L. Sherman, Esq.; Michael Zarrabian, Esq.; Sherman & Zarrabian LLP

(57) ABSTRACT

Embodiments of the present invention provide a system, method and computer program products for estimating data reduction in a file system. A method includes selecting a sample of all data from data files in the file system, wherein said sample represent a subset of all the data in the file system. The method further includes estimating a data reduction ratio by data deduplication for the file system based on said sample. The method further includes estimating a data reduction ratio by data compression for the file system based said sample. The method further includes generating a combined data reduction estimate for the file system based on said data compression estimate and said data deduplication estimate.

20 Claims, 4 Drawing Sheets

(56) References Cited

OTHER PUBLICATIONS

Xing, Y. et al., "PeerDedupe: Insights into the Peer-assisted Sampling Deduplication", Proceedings of the 2010 IEEE Tenth International Conference on Peer-to-Peer Computing, Aug. 25-27, 2010, pp. 1-10, IEEE, United States.

Constantinescu, C. et al, "Quick Estimation of Data Compression and De-Duplication for Large Storage Systems", Proceedings of the 1st International Conference on Data Compression, Communication and Processing, Jun. 22, 2011, pp. 1-5, IEEE Computer Society, United States.

* cited by examiner

ESTIMATING DATA REDUCTION IN STORAGE SYSTEMS

BACKGROUND

The present invention relates generally to data reduction storage systems, and more particularly to data reduction estimation for storage systems.

Storage systems are utilized in information technology environments such as enterprise computing systems. Because information technology system managers are generally interested in increasing data storage efficiency, many modern storage systems provide data reduction for increasing storage efficiency and storage savings. The storage savings generally depend on the nature of data being subjected to data reduction. As such, the potential storage savings offered by data reduction schemes depends on the amount and peculiarities of the data in such storage systems.

BRIEF SUMMARY

Embodiments of the present invention provide data reduction estimation in storage systems.

An exemplary embodiment includes a method for estimating data reduction in the file system, wherein the method includes selecting a sample of all data from data files in the file system, such that said sample represents a subset of all the data in the file system. The method further includes estimating the data reduction by data deduplication for the file system based on said sample. The method further includes estimating the data reduction by data compression for the file system based said sample. The method further includes generating a combined data reduction estimate for the file system based on said data compression estimate and said data deduplication estimate.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
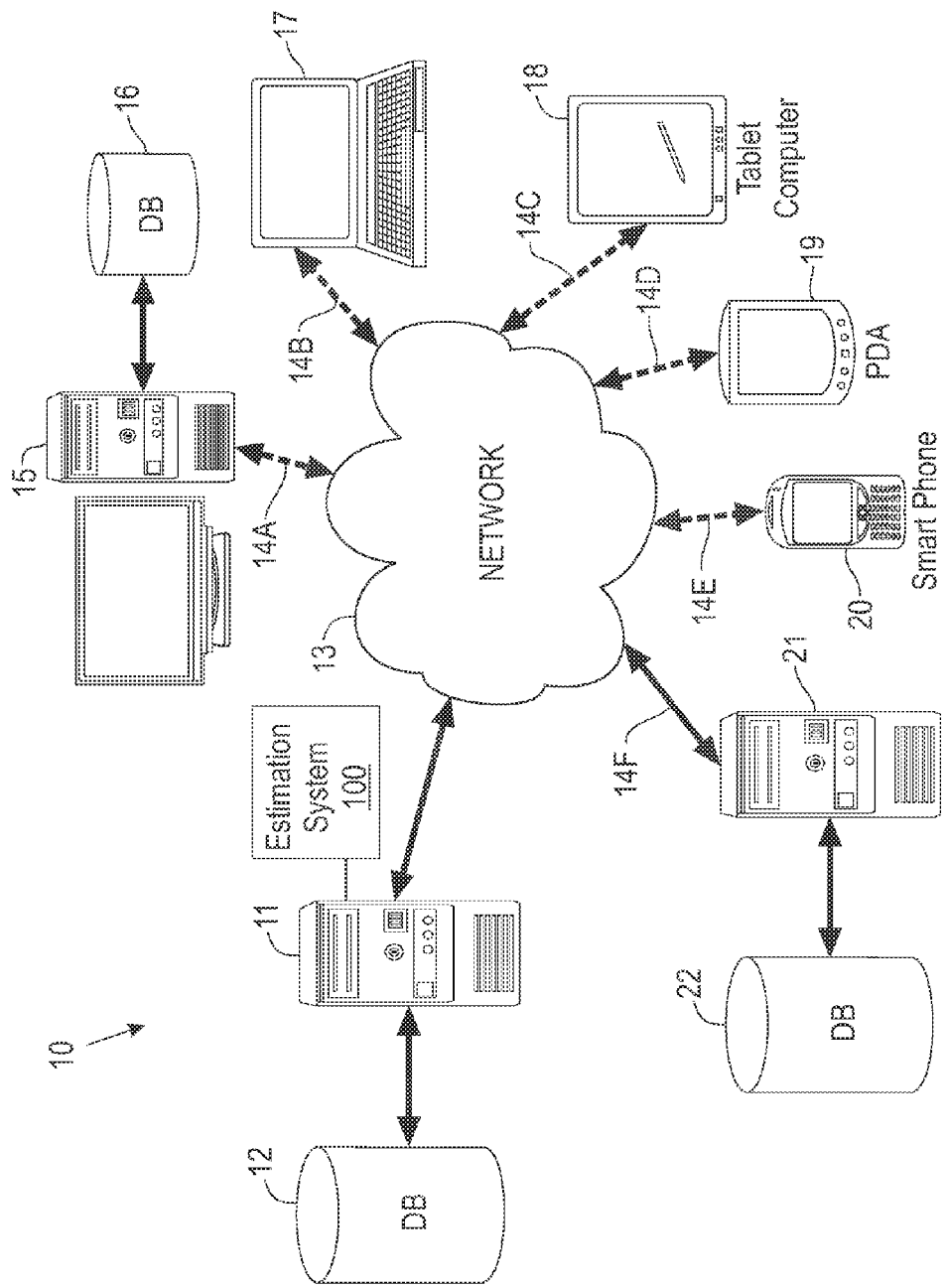
FIG. 1 is a block diagram illustrating an example of the network environment for estimation of data compression and data deduplication in a storage system, according to an embodiment of the present invention.

The detailed description explains the preferred embodiments of the invention, together with advantages and features, by way of example with reference to the drawings.

DETAILED DESCRIPTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

One or more exemplary embodiments of the invention are described below in detail. The disclosed embodiments are intended to be illustrative only since numerous modifications and variations therein will be apparent to those of ordinary skill in the art.

Embodiments of the present invention relate to estimation of data compression and data deduplication on large storage systems. Embodiments of the present invention allow estimating data reduction effectiveness by estimating data compression or deduplication ratios (or amounts) for very large storage systems.

In one embodiment of the present invention, an estimation system implementing a data reduction estimation process for estimation of data compression and data deduplication in storage system, estimates the compression and chunk-wise duplicates by selecting data from files that are largest in the storage system, and estimates the full-file duplicates by selecting files that have same sizes with other files. This selection is representative, and reduces estimation time.

Embodiments of the data reduction estimation process and system according to the invention estimate data compression and deduplication effectiveness without compressing or deduplicating all of the data in the file system. Embodiments of the invention are useful for estimation of deduplication for a large amount of data in large storage system. Embodiments of the invention quickly and accurately estimate data reduction (data compression and deduplication) for large storage that is reasonably accurate and reasonably low-overhead in terms of data read from a file system in order to perform the data reduction estimation for the file system.

According to an embodiment of the invention, a method for estimating data reduction in a file system includes selecting a sample of data in a file system, wherein said sample represent a subset of all the data from data files in the file system. The method further includes estimating the data reduction by data deduplication for the file system based on said sample (in one embodiment, estimating the data deduplication includes estimating a full-file data deduplication and a chunk-wise data deduplication for the file system based on said sample). The method further includes estimating the data reduction by data compression for the file system based said sample. The method further includes generating a combined data reduction estimate for the file system based on said data compression estimate and said data deduplication estimate.

Figure 2:
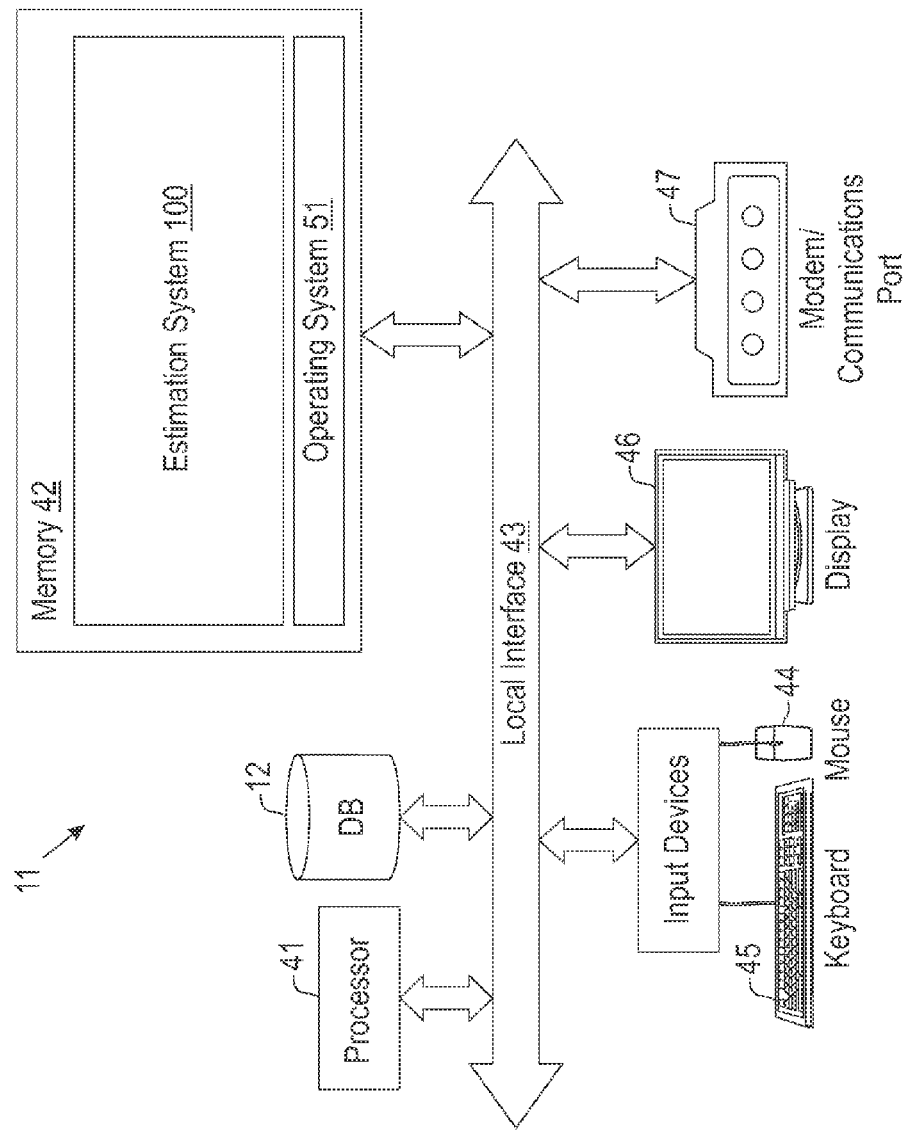
FIG. 2 is a block diagram illustrating an example of a server utilizing a data reduction estimation process for estimation of data compression and data deduplication, according to an embodiment of the present invention, as shown in FIG. 1.

Referring now to the drawings, in which like numerals illustrate like elements throughout the several views, FIG. 1 illustrates an example of the basic components of a system 10 utilizing an estimation system for estimation of data compression and data deduplication on large storage systems, used in connection with a preferred embodiment of the present invention. The system 10 includes a server 11 and the remote devices 15 and 17-20 that may utilize the estimation system of the present invention. Illustrated in FIG. 2 is a block diagram demonstrating an example of server 11, as shown in FIG. 1, utilizing the estimation system 100 according to an embodiment of the present invention. The estimation system 100 utilizes an estimation process for estimating data reduction in a file system, according to an embodiment of the invention. In another embodiment, the estimation system 100 may be implemented as a standalone system as shown in FIG. 1. In another embodiment, the estimation system 100 may be implemented in the computer system 21.

In one example, data on server 11 comprises a large storage system, where the database 12 contains metadata of the stored data on server 11. In one example, data on server 21 comprises a large storage system, where the database 22 contains metadata of the stored data on server 21. In one example, server 15 comprises a large storage system, where the database 16 contains metadata of the stored data on server 15.

Figure 3:
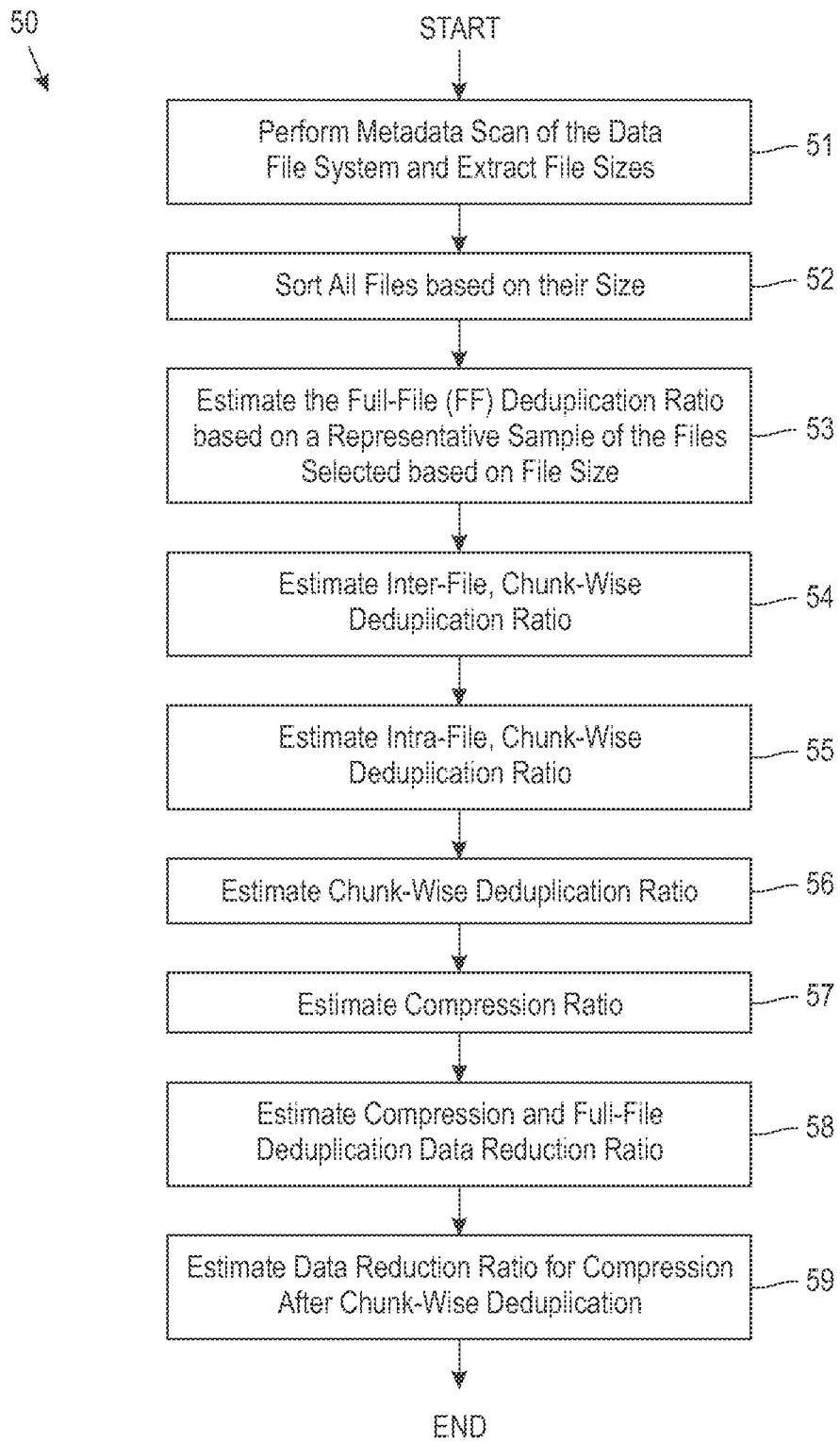
FIG. 3 shows a flowchart illustrating an estimation process for a data reduction estimation process for estimation of data compression and data deduplication, according to an embodiment of the present invention.

FIG. 3 is a flowchart of an estimation process 50 for the estimation system 100 for estimation of data compression and data deduplication in a storage system, according to an embodiment of the invention. In one example, said data reduction estimation process estimates full-file duplicates, chunk-wise data duplicates and data compression efficiency in a data storage file system (e.g., 100 Terabytes (TB) or more of data), wherein metadata of the file system is available.

Referring to FIG. 3, process block 51 comprises performing a metadata scan of the file system wherein the data resides, and extracting file sizes. For example, the metadata can comprise per-file metadata by scanning attributes of all files either by a metadata scan, by a namespace traversal or simply by listing the directories. For example, for a storage system managed by a DBMS, one can collect metadata of all tables by going through the system table.

Process block 52 comprises sorting all files by their size in a descending order. There are many ways to sample data, from a file system, to obtain an estimate of the overall data reduction ratio achievable on the entire file system. Generally, data content in a file is likely to be homogeneous, as such; selecting data from files with large sizes provides a representative sample of data in a file system for estimating the amount of data reduction that can be achieved by data compression and data deduplication of data in the file system. The estimation process utilizes the representative sample of data for estimating the data compression ratio and data deduplication ratio.

Process block 53 comprises estimating a full-file (FF) deduplication ratio using a sample of files with large sizes. Full-file duplicates exist in file systems with the same file size. One implementation of estimating the FF deduplication ratio comprises selecting all files larger than M KB (e.g., 8 KB) that have equal sizes, and denoting these files as a set of M files. For each of M files, the first L KB (e.g., 4 KB) of the file is accessed (i.e., read from the file system,) and a hash (e.g., SHA-256 signature) of the first L KB is computed.

Among all the M files, if two files have the same size and have the same signature for the first L KB and the first L KB is not all zeros, then the two files are estimated to be full-file duplicates of each other. All FF duplicates are removed (keeping only the unique files). A FF deduplication ratio $R_{ff}$ is calculated for the remaining files as the ratio of remaining unique files size over the total file system data size (the smaller the ratio, the better FF deduplication).

Process block 54 comprises estimating an inter-file, chunk-wise deduplication ratio. Inter-file chunk duplicates of file "heads" (beginnings) provide an optimistic estimation of inter-file chunk duplication because file heads tend to have more common chunks with other files (e.g., background pictures for graphic presentations).

After removing FF duplicates in process block 53, the top N files that contribute to a % (e.g., a=50) of all bytes in the data storage file system are selected. For each of the N files, the distinct chunks among the first M chunks (e.g., M=256) are calculated as $D_i$ chunks. Further, inter-file chunk deduplication ratio $R_{inter}$ is calculated as (Overall Distinct Chunks Among all $D_i$ chunks)/(Sum of $D_i$).

Process block 55 comprises estimating an intra-file, chunk-wise deduplication ratio. In one implementation, after removing FF duplicates in process block 53, the top N files that contribute to a % (e.g., a=50) of all bytes in the file system of the data storage are selected. For each of the N files, the first M (e.g., M=256) chunks of the file are read and a ratio $R_{intra}$ is calculated as D: distinct chunks among M chunks/M.

Process block 56 comprises estimation of a chunk-wise deduplication ratio. One implementation comprises multiplying the estimated inter-file chunk-wise deduplication ratio from process block 54 with the estimated intra-file chunk-wise deduplication ratio from process block 55, to obtain an non-FF chunk-wise deduplication ratio as $R_{non-ff}$. The ratios $R_{ff}$ and $R_{non-ff}$ multiplied together to obtain the final chunk-wise deduplication ratio.

Process block 57 comprises estimation of a compression ratio. One implementation comprises selecting top N files that contribute to a % (e.g., a=50) of all bytes in the file system of the data storage. For each of N files $F_i$, the first M chunks (e.g., M=256) are compressed to obtain a compression ratio $R_{comp\_i}$. A ratio $R_{comp\_i}$ is assigned to be the compression ratio of the whole file. An overall compression ratio $R_{comp}$ is calculated as overall (Sum of $F_i$ FileSize*$R_{comp\_i}$)/(Sum of $F_i$ file size).

Process block 58 comprises estimation of compression and full-file deduplication data reduction ratio. One implementation comprises determining a combined data reduction ratio as mathematical product of the ratios $R_{ff}$ and $R_{comp}$ (i.e., $R_{ff}*R_{comp}$).

Figure 4:
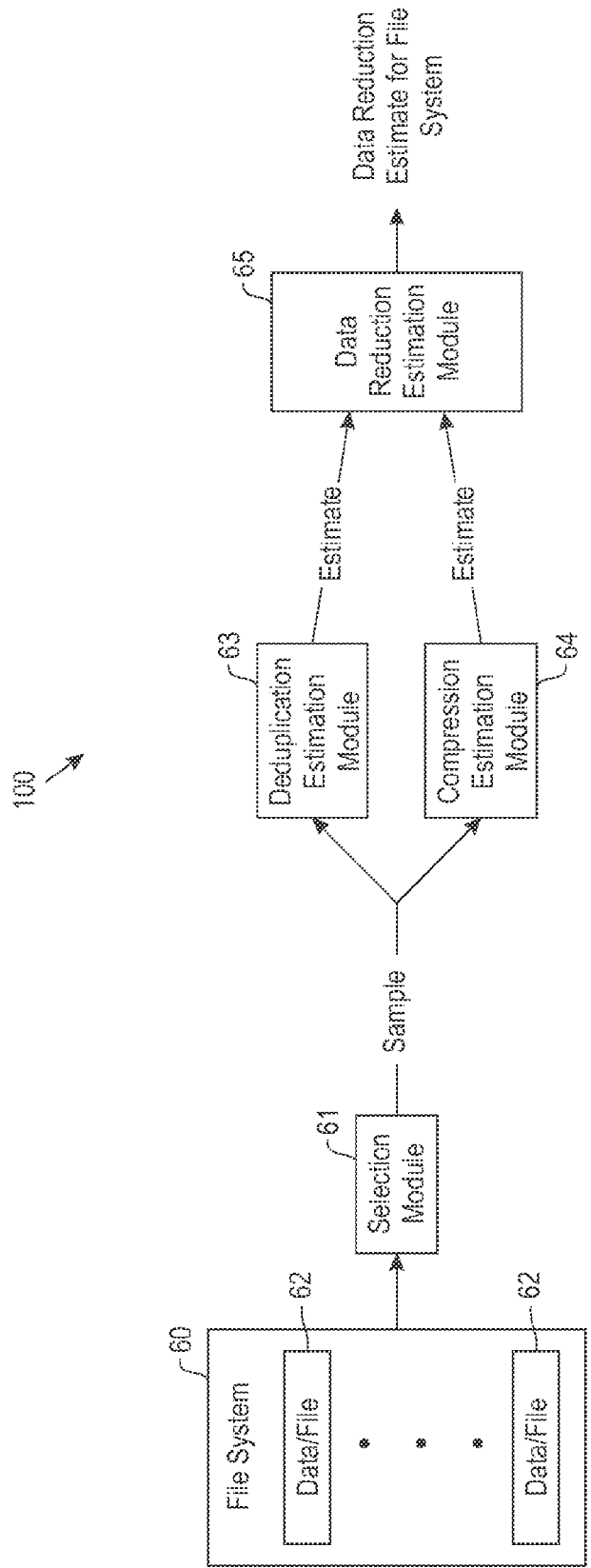
FIG. 4 shows a block diagram of components of an estimation system for data reduction estimation in a file system of an information technology environment, according to an embodiment of the invention.

Process block 59 comprises estimation of a data reduction ratio for compression after chunk-wise deduplication using the sample of files, as a combined data reduction ratio obtained as mathematical product of the ratios $R_{inter}$ and $R_{ff}$ and $R_{comp}$ (i.e., $R_{inter}*R_{ff}*R_{comp}$). Estimating compression after chunk-wise deduplication takes into account that two files sharing the same chunk may not share chunks after compression. FIG. 4 shows a block diagram of components of an embodiment of the estimation system 100 for data reduction estimation (e.g., process 50 above) in a file system 60 of an information technology environment (e.g., FIGS. 1-2), according to an embodiment of the invention. A selection module 61 selects a sample of data in the file system 60. The sample includes a file sample of data/files 62 in the file system and a byte sample of data bytes in the file system based on the file sample, wherein said file sample represents a subset of all the data files in the file system, and said byte sample represents a subset of all data bytes in the file system.

A data deduplication estimation module 63 estimates a data reduction by data deduplication for the file system 60 based on said file sample and said byte sample. A data compression estimation module 64 estimates a data reduction by data compression for the file system based on said byte sample. A data reduction estimation module 65 generates a combined data reduction estimate for the file system based on said data compression estimate and said data deduplication estimate.

In one embodiment, selecting a sample of data in the file system includes obtaining metadata for data files in the file system and selecting a sample of the data files in the file system based on the metadata for each file. Obtaining metadata for data files in a file system further comprises obtaining a size for each file, and selecting a sample of the data files further comprises selecting a sample of the data files based on data file size.

In one embodiment, selecting a sample of the data files further comprises sorting the data files based on sizes, and selecting files with large sizes as the file sample of the data files, and a portion of each sampled file as the byte sample of all data in the data files.

In one embodiment, estimating said data reduction by data deduplication further comprises estimating a FF data deduplication ratio based on said file sample and said byte sample, estimating an inter-file, chunk-wise data deduplication ratio based on said byte sample, and estimating an intra-file, chunk-wise data deduplication ratio based on said byte sample.

In one embodiment, estimating said data reduction by data deduplication comprises estimating a chunk-wise data deduplication ratio based on said inter-file, chunk-wise deduplication ratio and said intra-file, chunk-wise data deduplication ratio. In one embodiment, estimating said data reduction by data compression comprises estimating a data compression ratio based on said byte sample.

In one embodiment, generating a data reduction estimate for the file system comprises estimating a data reduction ratio by the combination of compression and full-file deduplication based on said FF data deduplication ratio and said data compression ratio; and estimating a data reduction ratio by compression after chunk-wise deduplication based on said data reduction ratio by the combination of compression and full-file deduplication, and said inter-file, chunk-wise deduplication ratio.

Each of the remote devices 15 and 17-20 shown in FIG. 1 has applications and can have a local database 16. Server 11 contains applications, and a database 12 that can be accessed by remote device 15 and 17-20 via connections 14(A-F), respectively, over network 13. In one implementation, the server 11 executes software for a computer network and controls access to itself and database 12.

The remote devices 15 and 17-20 may access the database 12 over a network 13, such as but not limited to: the Internet, a local area network (LAN), a wide area network (WAN), via a telephone line using a modem (POTS), Bluetooth, WiFi, WiMAX, cellular, optical, satellite, radio frequency (RF), Ethernet, magnetic induction, coax, RS-485, the like or other like networks. The server 11 may also be connected to the LAN within an organization.

The remote devices 15 and 17-20 may each be located at remote sites. Remote device 15 and 17-20 include but are not limited to, PCs, workstations, laptops, handheld computers, pocket PCs, PDAs, pagers, wireless application protocol (WAP) devices, non-WAP devices, cell phones, palm devices, printing devices and the like. When a user at one of the remote devices 15 and 17-20 desires to access data from the database 12 at the server 11, the remote device 15 and 17-20 communicates over the network 13, to access the server 11 and database 12.

Third party computer systems 21 and databases 22 can be accessed by the server 11 (FIG. 2). Data that is obtained from third party computer systems 21 and database 22 can be stored on server 11 and database 12 in order to provide later access to the user on remote devices 15 and 17-20. It is also contemplated that for certain types of data that the remote devices 15 and 17-20 can access the third party computer systems 21 and database 22 directly using the network 13.

The server 11 includes, but is not limited to, PCs, workstations, laptops, PDAs, palm devices and the like. The processing components of the third party computer systems are similar to that of the description for the server 11.

Generally, in terms of hardware architecture, as shown in FIG. 2, the server 11 includes a processor 41, a computer readable medium such as memory 42, and one or more input and/or output (I/O) devices (or peripherals) that are communicatively coupled via a local interface 43. The local interface 43 can be, for example but not limited to, one or more buses or other wired or wireless connections, as is known in the art. The local interface 43 may have additional elements, which are omitted for simplicity, such as controllers, buffers (caches), drivers, repeaters, and receivers, to enable communications.

Further, the local interface 43 may include address, control, and/or data connections to enable appropriate communications among the aforementioned components.

The processor 41 is a hardware device for executing software that can be stored in memory 42. The processor 41 can be virtually any custom made or commercially available processor, a central processing unit (CPU), data signal processor (DSP) or an auxiliary processor among several processors associated with the server 11, and a semiconductor based microprocessor (in the form of a microchip) or a microprocessor.

The memory 42 can include any one or combination of volatile memory elements (e.g., random access memory (RAM), such as dynamic random access memory (DRAM), static random access memory (SRAM), etc.) and nonvolatile memory elements (e.g., read only memory (ROM), erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 42 may incorporate electronic, magnetic, optical, and/or other types of storage media. Note that the memory 42 can have a distributed architecture, where various components are situated remote from one another, but can be accessed by the processor 41.

The software in memory 42 may include one or more separate programs, each of which comprises an ordered listing of executable instructions for implementing logical functions. In the example illustrated in FIG. 2, the software in the memory 42 includes a suitable operating system (O/S) 51 and the estimation system 100 of the present invention. The estimation system 100 comprises functional components and process blocks described further below.

The operating system 51 essentially controls the execution of other computer programs, such as the estimation system 100, and provides scheduling, input/output control, file and data management, memory management, and communication control and related services. However, the estimation system 100 of the present invention is applicable on all other commercially available operating systems.

The estimation system 100 may comprise a source program, executable program (object code), script, or any other entity comprising a set of computer program instructions to be performed. When the estimation system 100 is a source program, then the program is usually translated via a compiler, assembler, interpreter, or the like, which may or may not be included within the memory 42, so as to operate properly in connection with the O/S 51. Furthermore, the estimation system 100 can be written as (a) an object oriented programming language, which has classes of data and methods, or (b) a procedure programming language, which has routines, subroutines, and/or functions. The computer program instructions may execute entirely on server 11, partly on the server 11, as a stand-alone software package, partly on server 11 and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The I/O devices may include input devices, for example but not limited to, a mouse 44, keyboard 45, scanner (not shown), microphone (not shown), etc. Furthermore, the I/O devices may also include output devices, for example but not limited to, a printer (not shown), display 46, etc. Finally, the I/O devices may further include devices that communicate both inputs and outputs, for instance but not limited to, a network interface card (NIC) or modulator/demodulator 47 (for accessing remote devices, other files, devices, systems, or a network), a RF or other transceiver (not shown), a telephonic interface (not shown), a bridge (not shown), a router (not shown), etc.

If the server 11 is a PC, workstation, intelligent device or the like, the software in the memory 42 may further include a basic input output system (BIOS) (omitted for simplicity). The BIOS is a set of essential software routines that initialize and test hardware at startup, start the O/S 51, and support the transfer of data among the hardware devices. The BIOS is stored in some type of read-only-memory, such as ROM, PROM, EPROM, EEPROM or the like, so that the BIOS can be executed when the server 11 is activated.

When the server 11 is in operation, the processor 41 is configured to execute software stored within the memory 42, to communicate data to and from the memory 42, and generally to control operations of the server 11 pursuant to the software. The estimation system 100 and the O/S 51 are read, in whole or in part, by the processor 41, perhaps buffered within the processor 41, and then executed.

When the estimation system 100 is implemented in software, as is shown in FIG. 2, it should be noted that the estimation system 100 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

More specific examples (a non-exhaustive list) of the computer-readable medium would include the following: an electrical connection (electronic) having one or more wires, a portable computer diskette (magnetic or optical), a RAM (electronic), a ROM (electronic), an EPROM, EEPROM, or Flash memory (electronic), an optical fiber (optical), and a CDROM, CD R/W (optical). Note that the computer-readable medium could even be paper or another suitable medium, upon which the program is printed or punched (as in paper tape, punched cards, etc.), as the program can be electronically captured, via for instance optical scanning of the paper or other medium, then compiled, interpreted or otherwise processed in a suitable manner if necessary, and then stored in a computer memory.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

In an alternative embodiment, where the estimation system 100 is implemented in hardware, the estimation system 100 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The remote devices 15 and 17-20 provide access to the estimation system 100 of the present invention on server 11 and database 12 using for example, but not limited to an Internet browser. The information accessed in server 11 and database 12 can be provided in a number of different forms including but not limited to ASCII data, WEB page data (i.e., HTML), XML or other type of formatted data.

As illustrated, the remote devices 15 and 17-20 are similar to the description of the components for server 11 described with regard to FIG. 2. The remote devices 15 and 17-20 may be referred to as remote devices 15 for the sake of brevity.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be emphasized that the above-described embodiments of the present invention, particularly, any "preferred" embodiments, are merely possible examples of implementations, merely set forth for a clear understanding of the principles of the invention.

Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method for estimating data reduction in a file system, the method comprising:
    selecting a sample of data in the file system, including a file sample of data files and a byte sample of data bytes, wherein said file sample represents a subset of all the data files and said byte sample represents a subset of all data bytes, in the file system;
    estimating a data reduction by data deduplication for the file system based on said file sample and said byte sample;
    estimating a data reduction by data compression for the file system based on said byte sample; and
    generating a combined data reduction estimate for the file system based on said data compression estimate and said data deduplication estimate.

2. The method of claim 1, wherein selecting a sample of data in the file system comprises obtaining metadata for the data files in the file system and selecting a sample of the data files in the file system based on the metadata for each file.

3. The method of claim 2, wherein:
    obtaining metadata for the data files in the file system further comprises obtaining a size for each file; and
    selecting a sample of the data files further comprises selecting a sample of the data files based on file size.

4. The method of claim 3, wherein selecting a sample of the data files further comprises sorting the data files based on size, and selecting files larger than a threshold value as the file sample of the data files, and a portion of each sampled file as the byte sample of all data in the data files.

5. The method of claim 1, wherein estimating said data reduction by data deduplication comprises:
    estimating a full-file (FF) data deduplication ratio based on said file sample and said byte sample;
    estimating an inter-file chunk-wise data deduplication ratio based on said byte sample; and
    estimating an intra-file chunk-wise data deduplication ratio based on said byte sample.

6. The method of claim 5, wherein estimating said data reduction by data deduplication comprises:
    estimating a chunk-wise data deduplication ratio based on said inter-file chunk-wise deduplication ratio and said intra-file chunk-wise data deduplication ratio.

7. The method of claim 6, wherein estimating said data reduction by data compression comprises estimating a data compression ratio based on said byte sample.

8. The method of claim 7, wherein generating a data reduction estimate for the file system comprises:
    estimating a data reduction ratio by the combination of compression and full-file deduplication based on said FF data deduplication ratio and said data compression ratio; and
    estimating a data reduction ratio by compression after chunk-wise deduplication based on said data reduction ratio by the combination of compression and full-file deduplication, and said inter-file, chunk-wise deduplication ratio.

9. A system comprising:
    an estimation device for estimating data reduction in a file system of a storage device, wherein the estimation device includes:
        a selection module that selects a sample of data in the file system, wherein said sample represent a subset of all the data in the file system;
        a data deduplication estimation module that estimates a data reduction by data deduplication for the file system based on said sample;

a data compression estimation module that estimates a data reduction by data compression for the file system based said sample; and a data reduction estimation module that generates a combined data reduction estimate for the file system based on said data compression estimate and said data deduplication estimate.

10. The system of claim 9, wherein:

the selection module obtains metadata for the data files in the file system including a size for each file, selects a file sample of the data files based on data file size, and further selects a portion of each file in said file sample as a byte sample of data.

11. The system of claim 10, wherein the data deduplication estimation module:

estimates a full-file (FF) data deduplication ratio based on said file sample and said byte sample;

estimates an inter-file, chunk-wise deduplication ratio based on said byte sample; and estimates an intra-file, chunk-wise data deduplication ratio based on said byte sample.

12. The system of claim 11, wherein the data deduplication estimation module estimates a chunk-wise data deduplication ratio based on said inter-file, chunk-wise deduplication ratio and said intra-file, chunk-wise data deduplication ratio.

13. The system of claim 12, wherein the data compression estimation module estimates a data compression ratio based on said byte sample.

14. The system of claim 13, wherein the data reduction estimation module:

estimates a data reduction ratio of combining compression and full-file deduplication based on said full-file (FF) data deduplication ratio and said data compression ratio; and estimates a data reduction ratio of compression after chunk-wise deduplication based on said data reduction ratio of combining compression and full-file deduplication, and said inter-file, chunk-wise deduplication ratio.

15. A computer program product for estimating data reduction in a file system, the computer program product comprising:

a tangible non-transitory storage medium readable by a computer system and storing instructions for execution by the computer system for performing a method comprising:

selecting a sample of data in the file system, including a file sample of data files in the file system and a byte sample of data bytes in the file system based on the file sample, wherein said file sample represents a subset of all the data files in the file system, and said byte sample represents a subset of all data bytes in the file system estimating a data reduction by data deduplication for the file system based on said file sample and byte sample;

estimating a data reduction by data compression for the file system based said byte sample; and generating a combined data reduction estimate for the file system based on said data compression estimate and said data deduplication estimate.

16. The computer program product of claim 15, further comprising:

obtaining a size for each file; and selecting a file sample of the data files based on data file size, and further selecting a portion of each file in the file sample as a byte sample of data in data files.

17. The computer program product of claim 15, further comprising:

estimating a full-file (FF) data deduplication ratio based on said file sample and byte sample;

estimating an inter-file, chunk-wise deduplication ratio based on said byte sample; and estimating an intra-file, chunk-wise data deduplication ratio based on said byte sample.

18. The computer program product of claim 17, further comprising:

estimating a chunk-wise data deduplication ratio based on said inter-file, chunk-wise deduplication ratio and said intra-file, chunk-wise data deduplication ratio.

19. The computer program product of claim 18, further comprising estimating a data compression data reduction ratio based on said byte sample.

20. The computer program product of claim 19, further comprising:

estimating a data reduction ratio of combining compression and full-file deduplication based on said full-file (FF) data deduplication ratio and said data compression ratio; and estimating a data reduction ratio of compression after chunk-wise deduplication based on said data reduction ratio of combining compression and full-file deduplication, and said inter-file, chunk-wise deduplication ratio.

* * * * *